July 19, 1966 G. R. TATE 3,261,482
STACKING APPARATUS FOR HAY BALES
Filed June 24, 1963 5 Sheets-Sheet 1
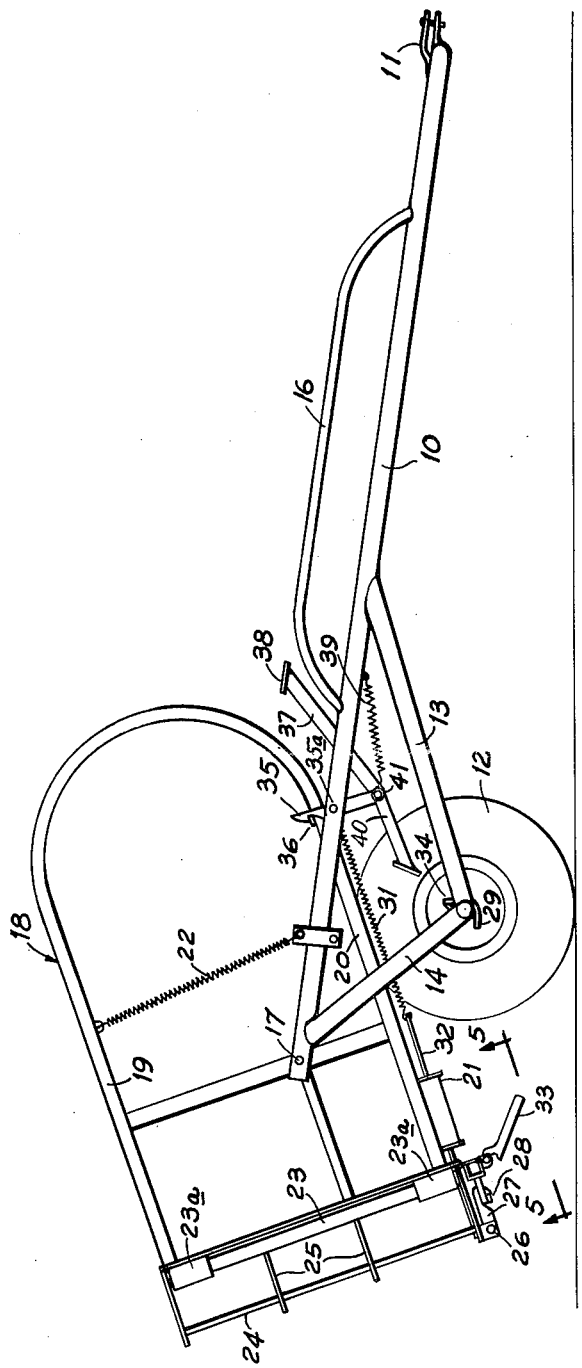
INVENTOR.
GEORGE R. TATE
BY Wells & St. John
ATTYS.

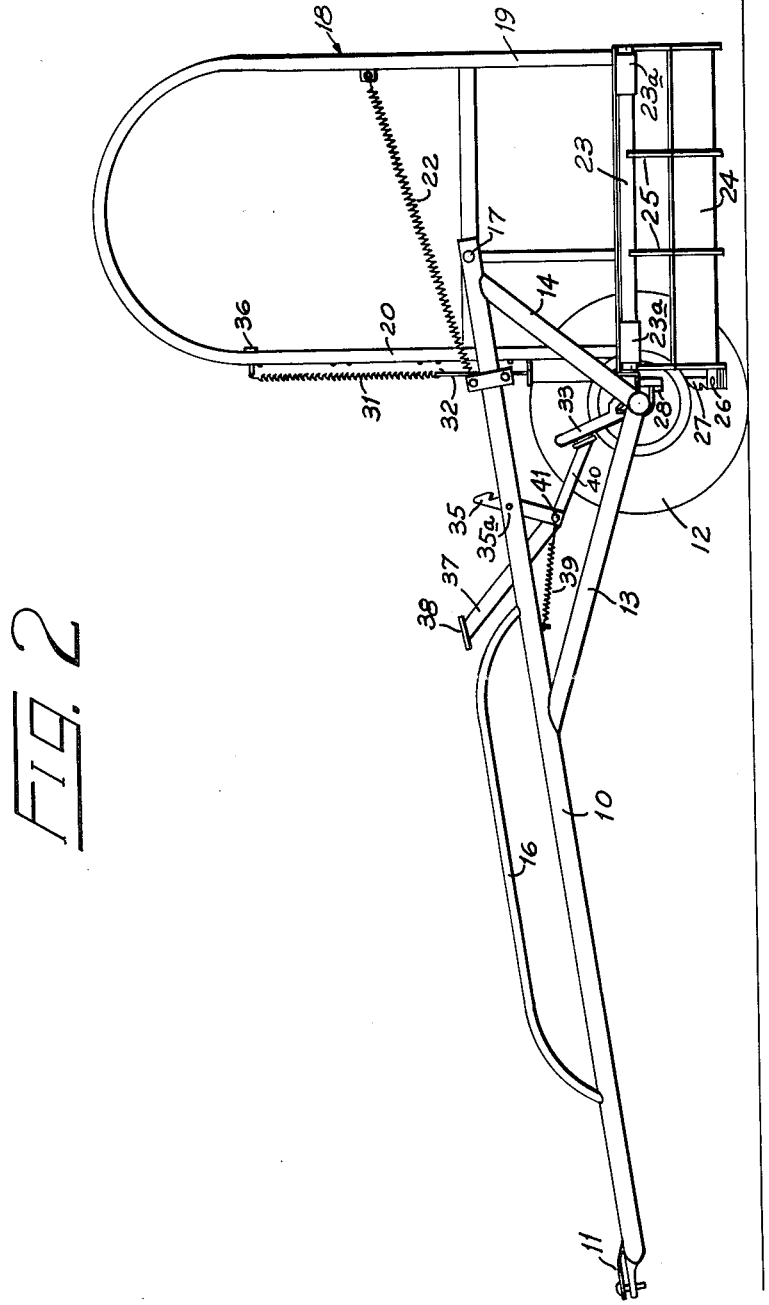

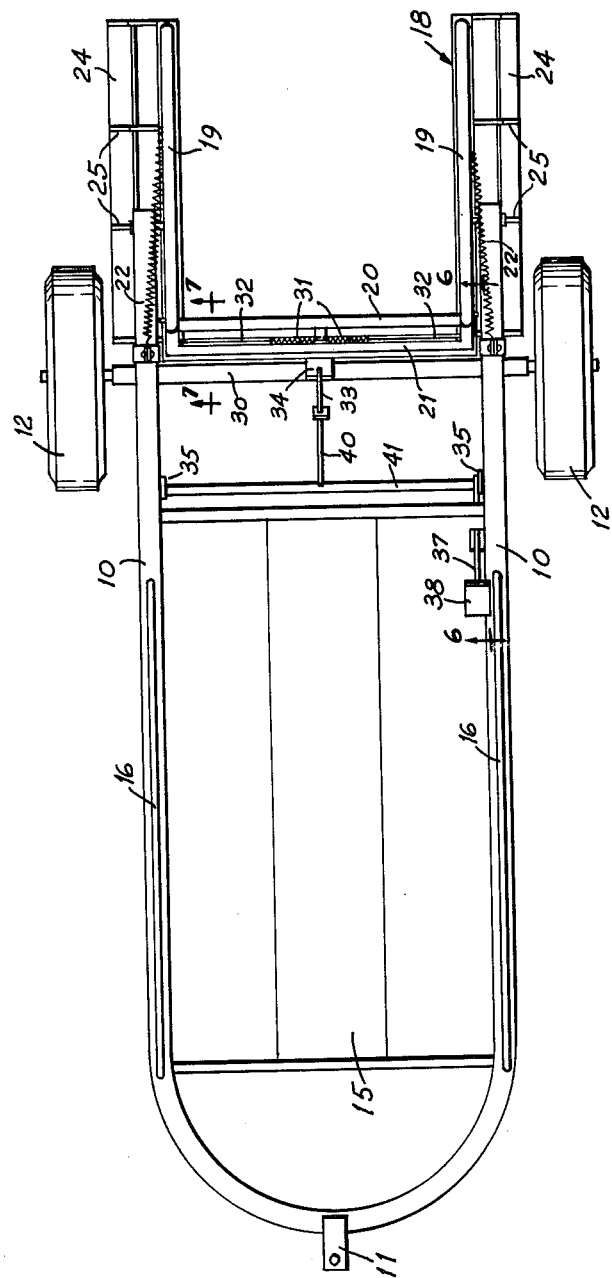

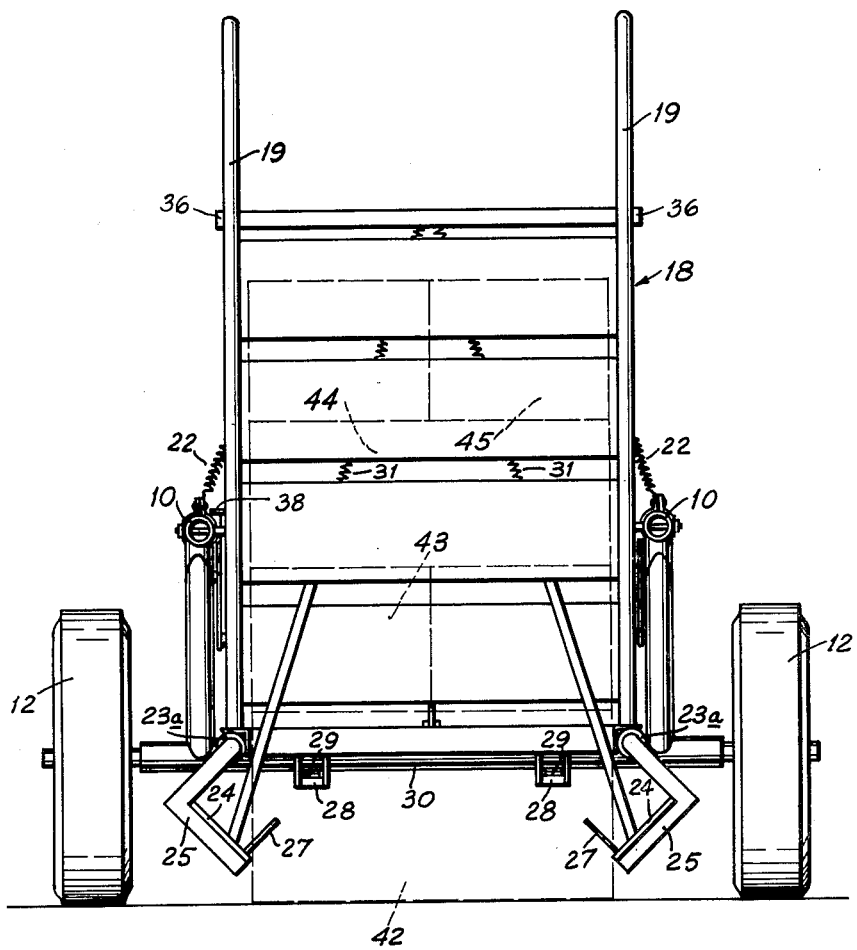

July 19, 1966 G. R. TATE 3,261,482
STACKING APPARATUS FOR HAY BALES
Filed June 24, 1963 5 Sheets-Sheet 5
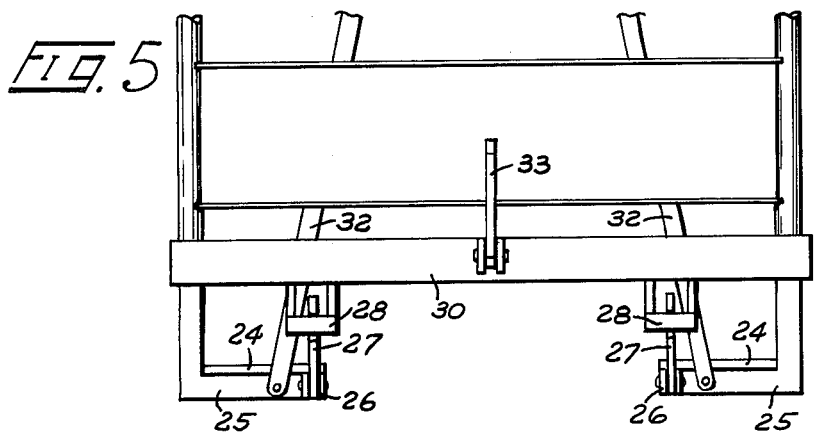
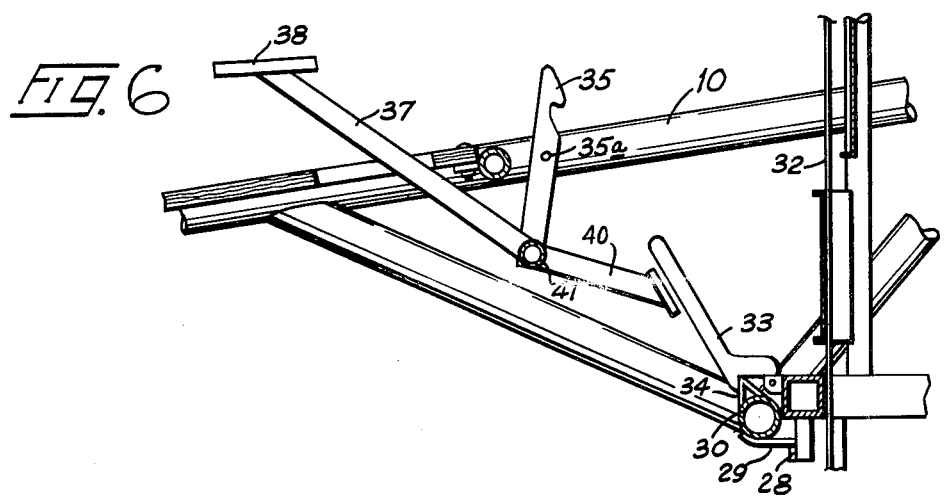
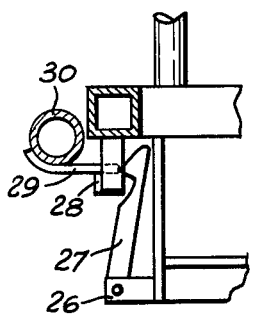
INVENTOR.
GEORGE R. TATE
BY
ATTYS.

United States Patent Office 3,261,482
Patented July 19, 1966

3,261,482
STACKING APPARATUS FOR HAY BALES
George R. Tate, Rice, Wash.
Filed June 24, 1963, Ser. No. 289,857
10 Claims. (Cl. 214—6)

This invention relates to a novel stacking apparatus designed to facilitate stacking of bales of hay in the field.

The device described below is designed primarily for small or medium sized farms or ranches which must handle a moderate number of hay bales for feed purposes, but whose size does not warrant the expense involved in purchasing and maintaining large automatic handling machinery. The stacking apparatus is manually operated, but is designed to produce a stable stack of hay with a minimum of positioning by the operator.

It is a first object of this invention to provide a simple hay stacking arrangement which can be drawn by a baler so as to stack the bales as they are ejected from the baler.

Another object of this invention is to provide such a baler which will require only one manual movement to set the bales on the ground and a second manual movement to return the apparatus to a positon for reception of a subsequent stack of bales.

Another object of this invention is to provide an automatic mechanism for setting a stack of bales on the ground after the stack has been arranged in proper position.

These and further objects will be evident from a study of the following disclosure, taken in conjunction with the accompanying drawings, which illustrate one preferred form of the invention. It is to be understood that the specific details of the arrangement illustrated in the drawings and described below are not intended to limit or restrict the scope of the invention, which is set out in the claims following the detailed specification.

In the drawings:

FIGURE 1 is an elevation view of the stacking apparatus showing it in position for the reception of bales;

FIGURE 2 is an elevation view similar to FIGURE 1, showing the apparatus in a position for setting of a stack of bales on the ground;

FIGURE 3 is a top view of the apparatus in the position shown in FIGURE 2;

FIGURE 4 is an enlarged rear view of the apparatus as seen in FIGURE 2, illustrating the position of the stack of bales in the collecting bin;

FIGURE 5 is an enlarged fragmentary view of the apparatus as seen along line 5—5 in FIGURE 1;

FIGURE 6 is an enlarged fragmentary sectional view of the foot pedal mechanism as seen along line 6—6 in FIFURE 3; and FIGURE 7 is an enlarged fragmentary view of the latch mechanism for a single bottom gate as seen along line 7—7 in FIGURE 3.

The device disclosed in the drawings and generally seen in FIGURES 1 through 4 is designed to receive bales of hay directly from a conventional string baling machine. The apparatus includes a frame, having longitudinal side members 10, at the front end of which is mounted a hitch 11 for attachment to a baling machine. The bales are received along a platform 15 on which an operator stands during operation of the apparatus. The bales are pushed along the platform 15 by ejection from the baling machine and are loaded manually into a bin designated generally by the numeral 18.

The frame of the machine is a wheeled mobile frame carried upon side wheels 12, which are mounted on axles rotatably carried by triangular frame members 13 and 14. The frame has suitable transverse members to provide the necessary strength and rigidity for support of the members mounted thereon. Mounted along the side members 10 are rails 16 which serve as longitudinal guides for the bales as they move along the platform 15.

Pivotally mounted on the frame at the rear ends of the members 10 is the bin 18 which is pivotally carried by stub shafts 17. The bin 18 has two sides 19 made of tubular members and a front wall 20 which completes the three sided bin structure. The front wall 20 is closed by wooden boards or other suitable sheet material so as to provide a supporting surface for the bales to be stacked therein. Wall 20 is recessed slightly at 21 along the lower end thereof, so as to better receive the bales in the manner in which they are preferably stacked, as will be described below.

The bin 18 is positioned about its axis on shaft 17 so that the loaded bin will be biased by the weight of the bales to the vertical position illustrated in FIGURE 2. The unloaded bin is biased to the inclined position illustrated in FIGURE 1 by springs 22 connected between the members 10 and the respective sides 19 of the bin 18 above the location of the shaft 17. Thus a loaded bin 18 will swing to the vertical position, while the unloaded bin 18 will swing back to the inclined position of FIGURE 1, wherein the forward wall 20 is inclined rearwardly and downwardly.

Mounted along the lower edges of each wall 19 is a shaft 23 rotatably carried by suitable bearings 23a fixed to the wall 19. The shaft 23 carries a lower gate 24 mounted on braces 25. The braces 25 are perpendicular in shape as can be seen in FIGURE 5, and the gate 24 at each side of the bin 18 is movable from a first position across the bin 18 (FIGURE 5) to a second position clearing the interior of the bin 18 (FIGURE 4). The gates 24 form a partial bottom wall in the bin 18 to support the lower bales of the stack formed therein.

At the front edge of each movable gate 24 is an ear 26 which pivotally supports a forwardly directed hook 27. When the unloaded bin 18 is inclined (FIG. 1), the hook 27 is adapted to ride over and engage a bar 28 fixed relative to the lower end of the wall 21 of bin 18 as the gate 24 on which it is mounted is pulled upwardly by springs 31 described below. The weight of each hook 27, while bin 18 is inclined, biases it to a normally engaged position over the top of bar 28. Subsequent loading of bin 18 by incoming bales that rest on the upper surfaces of gates 24 prevents accidental release of hooks 27 by frictional engagement of the respective hooks 27 on the top surface of bar 28.

Mounted on the axle casing 30 of the main frame of the apparatus in alignment with each hook 27 are individual rearwardly protruding straps 29 (FIGS. 6 and 7). The straps 29 are adapted to be contacted by the respective hooks 27 when the bin 18 has been pivoted to its vertical position as illustrated in FIGURE 7. Striking of the straps 29 by hooks 27 will free them from frictional engagement with the bars 28. When the bin 18 is in its vertical position, the weight of the hooks 27 allows them to fall back rearwardly, thereby permitting the loaded gates 24 to pivot downwardly and free the bales within bin 18.

In order to bias the gates 24 to the position wherein they extend across the bottom of the bin 18, there are provided a pair of springs 31 that extend along the forward surface of the wall 20 and are anchored thereto. The springs 31 act through respective bars 32 which are pivotally connected at their lower ends to the respective gates 24. Thus the gates 24 are normally biased upwardly to their closed positions.

Three is also provided a latch mechanism by which the bin 18 can be alternately held in its inclined or vertical positions. In order to maintain the bin 18 in an inclined position for the reception of a full stack of bales, there are provided a pair of latches 35 at each side of the members 10 adapted to engage a transverse bar 36 mounted across the wall 20 of the bin 18. This action can be seen in FIGURES 1, 2, and 6. The individual latches 35 at each side of the apparatus are coaxially pivoted at 35a on the respective members 10. Each latch 35 is fixed, at its lower end, to a connecting transverse shaft 41. Shaft 41 is not connected to member 10 at either side of the structure. An operating lever 37 mounted at one side of the apparatus is fixed at its lower end to the shaft 41 so as to pivot integrally with shaft 41 and latches 35 about the axis at 35a. Lever 37 is capped by foot pedal 38 fixed to it. The latches 35, as well as the shaft 41 and lever 37 fixed relative to them, are biased in a clockwise direction (FIGS. 2 and 3) by a tension spring 39 anchored to a side member 10.

At the front of the portion 21 of the bin 18 is a hook 33 adapted to engage an abutment 34 formed at the center of the axle casing 30. The hook 33 has sufficient bulk above and forward of it to normally bias itself to that engaged position due to its own weight. A second lever 40 is also fixed to the shaft 41 extending between the latches 35 and is aligned with the hook 33. Thus one can step downward on the pedal 38 and either disengage the hook 33 or the latches 35, depending on which is engaged at the time the pedal is actuated (see FIGURE 6).

The bales are preferably stacked as seen in FIGURE 4. The lowest tier of bales 42 will rest directly on the gate 24 and the portion 21 of the front wall of the bin 18. It is desirable that this first tier 42 be set on edge, and thus three bales can be accommodated across the width of the bin 18. The subsequent three layers of bales 43, 44, 45, are set on their sides and are oriented perpendicularly to the adjacent layers. Thus a total of nine bales can be stacked in the bin 18 while it is in the inclined position as shown in FIGURE 2.

The operator steps on the pedal 38 to release the latches from the bar 36. The weight of the bales will cause the bin 18 to pivot in the clockwise direction to the vertical position shown in FIGURE 2. Straps 29 will contact the hooks 27 and release them from engagement with the bars 28. The weight of the bales will then cause the gates 24 to open in opposition to the relatively weak springs 31. The bales will then be set upon the ground, but the bin 18 will be held in the vertical position due to the engagement of the hook 33 with the abutment 34. The operator will normally perform this operation without stopping the motion of the baling machine which draws the stacking apparatus.

When the bin 18 has cleared the stack of bales resting upon the ground, the pedal 38 will then be depressed, releasing the hook 33 and allowing springs 22 to return the bin 18 to its original inclined position. After the bales have been cleared, the springs 31 will cause the gate 24 to be raised to their closed position wherein the hooks 27 again engage the bars 28. Upon return of the bin 18 to the inclined position (FIGURE 1) the latches 35 will again engage the bar 36 and the entire operation will be repeated.

Thus I have described a very simple mechanical device for facilitating the arrangement and placement of bales in a field as they are received from a baling machine. The lower bales, being on edge, will have the strings in horizontal positions so that a fork lift with rod forks can be received under the bales for movement of the stack to their final storage location. The apparatus insures a tight stack of bales, without necessitating the carrying of individual bales along the field.

Minor modifications can readily be seen in the basic apparatus. Many of the latches could be modified or replaced by equivalent structures. For this reason the specific structure is not to restrict the scope of this invention, which is defined in the following claims.

Having thus described my invention, I claim:

1. A stacking apparatus for bales of hay ejected from a baling machine, comprising:
   a mobile frame adapted to be drawn by attachment to a baling machine;
   receiving platform means on said frame for the reception of bales;
   a collecting bin pivotally mounted on said frame for motion about a horizontal axis, said bin being movable from an inclined position to a vertical position;
   gate means at the lower end of the bin pivotally carried thereby for motion between a first position at which said gate means supports bales in the bin and a second position at which said gate means releases the bales for downwardly directed motion;
   latch means on said gate means and bin biased to a normally engaged position adapted, when engaged, to maintain said gate means in said first position relative to said bin;
   and biasing means connected between said bin and said gate means for normally urging said gate means to said first position.

2. The apparatus defined in claim 1 further comprising:
   means on said frame adapted to contact and release said latch means when said bin has attained its vertical position.

3. The apparatus defined in claim 1 further comprising:
   releasable means on said frame adapted to selectively engage and hold said bin in a fixed position relative to said frame while said bin is in its inclined position;
   and manually operable means on said framework operatively connected to said releasable means adapted, when actuated, to selectively release the bin from engagement therewith.

4. The apparatus defined in claim 1 wherein said axis of the bin is located thereon at a position wherein the bin, when fully loaded, is biased toward its vertical position;
   second latch means on said frame adapted to releasably engage said bin in its inclined position;
   and means operatively connected between said bin and said frame adapted to normally urge the bin, when unloaded, to its inclined position.

5. A stacking apparatus for bales of hay ejected from a baling machine, comprising:
   a wheeled mobile frame adapted to be drawn by attachment to a baling machine;
   receiving platform means on said frame for receiving and supporting bales ejected from a baling machine;
   a collecting bin adapted to support a tiered stack of bales, said bin being pivotally mounted on said frame for motion between a first position wherein the bin is inclined with respect to the vertical and a second position wherein the bin attains a vertical position;
   gate means pivotally mounted at the lower end of said bin, said gate means being movable between a closed position blocking the lower end of the bin for support of bales and an open position clearing the lower end of the bin for release of bales;
   latch means on said gate means for normally maintaining said gate means in said closed position;
   and means on said framework engageable with said latch means when said bin assumes its second position for selectively releasing said latch means.

6. A stacking apparatus for bales of hay ejected from a baling machine, comprising:
   a wheeled mobile frame adapted to be drawn by attachment to a baling machine;
   receiving platform means on said frame for receiving and supporting bales ejected from a baling machine;
   a three sided collecting bin adapted to support a tiered stack of bales, said bin being pivotally mounted at the rear end of said frame with the open side of the bin facing upwardly, the bin being movable between a first position wherein the lower side is inclined rearwardly and downwardly and a second position wherein all sides of the bin attain vertical positions;
a pair of gates pivoted respectively along two opposite sides of the bin at the lower ends thereof, said gates being movable between a closed position wherein the gates are directed inwardly toward one another and an open position clearing the lower end of the bin;
individual latch means on said gates for normally maintaining said gates in said closed position;
and means on said frame for selectively releasing said latch means.

7. The apparatus defined in claim 6 further comprising:
spring means connecting said bin and said frame being for normally returning the empty bin to said first position, the weight of bales in the fully loaded bin being sufficient to cause the bin to move to said second position following release of said latch means.

8. The apparatus as defined in claim 6 wherein the last-named means comprises:
an abutment on the frame for contact by said latch means when said bin attains said second position.

9. The apparatus as defined in claim 6 further comprising:
a releasable latch mechanism on said frame and said bin for selectively maintaining said bin in said first position.

10. The apparatus as defined in claim 6 further comprising:
a releasable latch mechanism on said frame and said bin for selectively maintaining said bin in said second position.

References Cited by the Examiner

UNITED STATES PATENTS

| 946,480 | 1/1910 | Allison | 56—361 |
| 1,833,282 | 11/1931 | France | 56—346 |
| 2,726,115 | 12/1955 | Babcock | 214—501 X |
| 2,919,953 | 1/1960 | Gruhlkey. | |
| 2,971,318 | 2/1961 | Solem | 56—473.5 |
| 3,092,272 | 6/1963 | Weigel | 214—501 X |

FOREIGN PATENTS 152,399   9/1955   Sweden.

GERALD M. FORLENZA, *Primary Examiner.*
MORRIS TEMIN, *Examiner.*